3,098,103
PURELY PARA THIOETHER POLYMERS
Walter Reifschneider, Midland, Mich., assignor to The
Dow Chemical Company, Midland, Mich., a corporation of Delaware
No Drawing. Filed June 27, 1962, Ser. No. 205,501
1 Claim. (Cl. 260—609)

The present invention is directed to polymeric thioethers and in particular is directed to novel thioethers corresponding to the formula

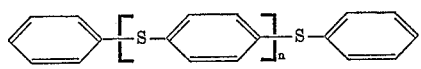

In the present specification and claims, $n$ represents an integer from 2 to 7, inclusive. The compounds are thus the doubly phenyl terminated linear p-phenylene sulfides, and linear poly(p-phenylene sulfide) polymers.

The novel compounds are colorless or lightly colored. Typically they are pure compounds of exact molecular weight. These are crystalline solids appearing white to pale yellow in mass, very slightly soluble in water but readily soluble in various common organic solvents such as benzene and the like. When of mixed molecular weights the compounds are of a glassy nature. The compounds are useful as herbicides and soil bonding agents. The compounds are also especially useful as additives to improve the properties of lubricating oils especially designed for operation under high pressures and temperatures; they are useful as intermediates in the preparation of dyestuffs and biologically active materials; they are also of value as solvent additives in the modification of behavior of mixed solvent systems.

The compounds are prepared by a halide-thiol condensation process which comprises the steps of causing a reaction between a p-halophenylpolyphenylene sulfide compound corresponding to the formula

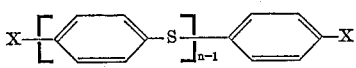

wherein X represents halogen, and benzenethiol. During the reaction to prepare the presents compounds, 2 molecules of benzenethiol react with each molecule of p-halophenylpolyphenylene sulfide. Small amounts of benzenethiol may be lost in side reactions. Thus, when it is desired to prepare the present compound in a high state of purity and with a minimum of necessary post-synthesis purification procedure, the starting reactants should be employed in equimolecular proportions, or preferably, with the benzenethiol in slight excess. However, other proportions may be employed if desired, and unconsumed starting material of whatever identity may, if desired, be recycled into further synthesis process.

The p-halophenylpolyphenylene sulfide starting materials are readily prepared by a synthesis which represents essentially a particular employment of the synthetic methods used in preparation of the present compounds; a method which will be understood by chemists in view of the following synthetic scheme, understood in light of the teachings herewith:

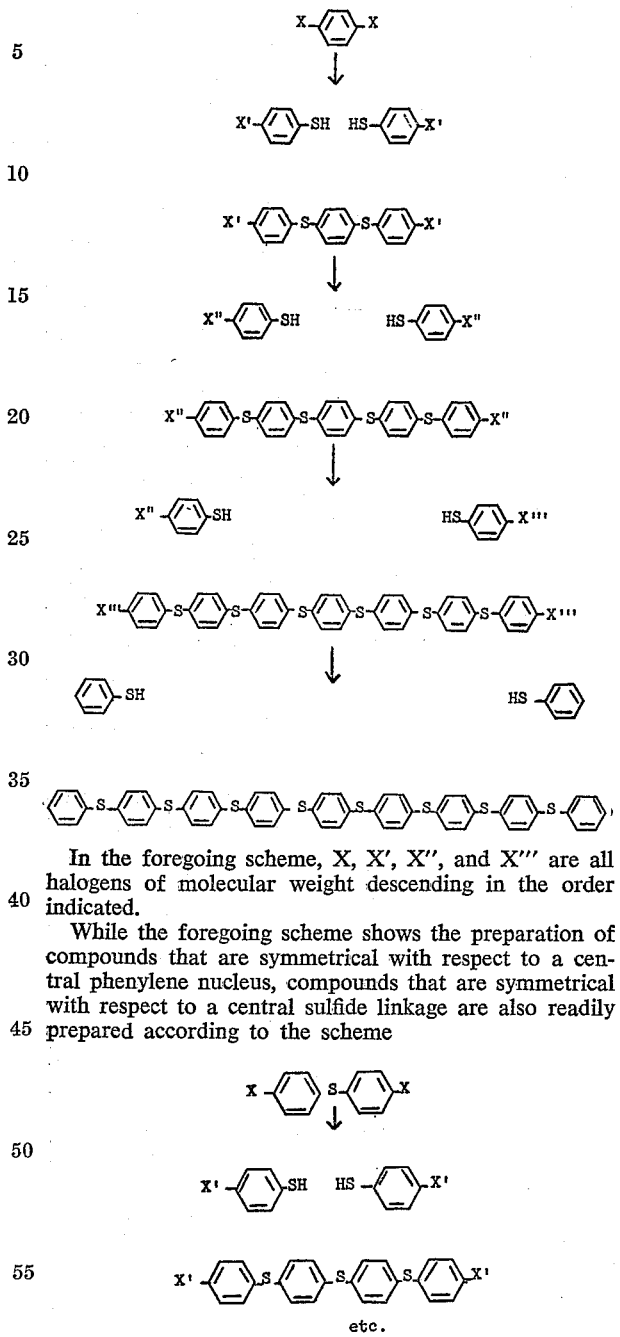

In the foregoing scheme, X, X', X", and X''' are all halogens of molecular weight descending in the order indicated.

While the foregoing scheme shows the preparation of compounds that are symmetrical with respect to a central phenylene nucleus, compounds that are symmetrical with respect to a central sulfide linkage are also readily prepared according to the scheme etc.

Also the unhalogenated benzenethiol may be employed at any step as chain terminating reactant. Instead of a halobenzenethiol, an alkali metal or cuprous halobenzenethiolate or benzenethiolate can be employed.

The halide-thiol condensation goes forward at temperatures over a wide range, such as 30° to 350° C., but initiates most readily when heated to a temperature somewhat higher than room temperature. A preferred temperature is from 120° to 230° C. Under these conditions the reaction is, in general, exothermic and goes forward to completion with good yield calculated upon the basis of consumed starting material. When employing a benzenethiol or halobenzenethiol, hydrogen halide of reaction is evolved and means for its orderly disposal are advantageously provided.

Typically, in the preparation of the compounds of the present invention, reaction between the thiol starting material and the aromatic halide starting material which may be an α,Ω-dihalopolyphenylene sulfide chain will initiate and go forward only when there is employed, a catalytic amount of both a source of cuprous ion and a nitrogenous base. Thus, in the preparation of many, and probably all of the present compounds, the employment of such catalyst is essential and critical, although the exact weight is not critical. Certainly the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed weight is not critical, but may vary from a very small trace amount, less than 1/100 of 1 molar percent, to as much as an amount equimolecular with either reactant or even greater. In general, the employment of larger amounts is accompanied by no major advantage and, being expensive, is not preferred.

The nitrogenous base may be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium such as a hydrocarbon oil.

It is preferred, in laboratory preparations, to employ the nitrogenous base catalyst substance in sufficient excess that portions of it may also act as hydrogen halide acceptor and yet further portions may continue to function, unreacted, in the necessary catalytic manner.

In carrying out the reaction to prepare the compounds of the present invention, the aromatic halide and the benzenethiol are intimately mixed and blended, in any order and in desired amounts, with source of cuprous ion and nitrogenous base as hereinbefore described, preferably in liquid reaction medium which may be inert reaction medium or preferably nitrogenous base catalytic reaction medium: and thereafter heated to a temperature at which reaction takes place promptly. In one convenient method of practicing the present method, the reaction temperature may be the reflux temperature of the liquid reaction mixture. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate usually forms from which the desired product can be extracted as a solvent-soluble fraction. Representative extraction solvents include diethyl ether, chlorinated hydrocarbons, and benzene. The said precipitate is extracted with solvent, the solvent extract dried over an inert drying agent such as, for example, anhydrous potassium sulfate or the like; the solvent vaporized and removed and the remaining product chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example I—Bis(p-Phenylthio)Phenyl)Sulfide*

A reaction mixture is prepared, consisting of 25.5 grams (0.1 mole) of bis(p-chlorophenyl)sulfide, 16 grams of cuprous oxide (technical grade) and 22 grams (approximately 0.2 mole) of benzenethiol dispersed in a mixture consisting of 110 milliliters quinoline and 10 milliliters pyridine. The resulting reaction mixture is placed in a flask under reflux, the reflux being equipped with a water trap. In this situation, the reaction mixture is heated at its reflux temperature (a pot temperature between approximately 200 and 240° C.) for 6 hours to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and is extracted with ether, the ether extract liquid being saved. This liquid is dried over a bed of anhydrous potassium carbonate which also neutralizes remaining traces of acidic substances; the resulting liquid is warmed to vaporize and remove ether solvent and obtain a residual oil. This oil crystallizes upon standing; the crystals are taken up in hot ethanol and precipitated therefrom as the ethanol cools to obtain a bis(p-phenylthio)phenyl) sulfide as white crystalline plates melting at 100–102° C. At the rate of 500 parts per million as sole toxicant in an aqueous spray, this compound kills young pigweeds and crabgrass plants.

*Example II*

A reaction mixture is prepared, containing, as liquid reaction medium, catalyst, and hydrogen halide acceptor, 150 grams cuprous oxide, 1.2 liters quinoline, and 125 milliliters pyridine. This mixture is placed in a flask, under reflux condenser, with entry port for the introduction of reactants, means for stirring, controlled heating, observation of temperature and, on the said reflux condenser, a water trap. In this situation, there is introduced thereinto, firstly, 0.1 gram-mole of p-diiodobenzene and, secondly, 0.2 gram-moles p-bromobenzenethiol. The resulting reaction mixture is heated at its reflux temperature (a pot temperature between approximately 200 and 240° C.) for 6 hours to carry to completion a first step reaction.

To the mixture resulting from the said first step there is added 0.2 gram-moles of p-chlorobenzenethiol. Heating under reflux and stirring are continued for 6 hours further to carry to completion a second step reaction.

Thereafter, there are introduced into the resulting second-step reaction mixture 0.2 gram-moles of p-fluorobenzenethiol. Heating, with stirring and under reflux are continued for 6 hours further, at the conclusion of which time there are then added 0.2 gram-moles of benzenethiol. Heating and stirring are continued for 6 hours more to carry to completion the preparation of the product of the present invention. At the end of the entire reaction period, the resulting hot mixture is poured into a mixture of shaved ice and excess concentrated hydrochloric acid. As a result of these procedures the ice melts and basic substances react with hydrochloric acid; in the resulting acidified water a precipitate forms. The precipitate is collected by filtration and is extracted with boiling toluene, the toluene extract liquid being saved. This liquid is dried over a bed of anhydrous potassium carbonate which neutralizes any remaining acidic traces and the resulting liquid is warmed to vaporize and remove toluene solvent and obtain a crystalline α,Ω-diphenylhepta-p-phenylene linear polymer product.

Presumably because the present product is stoichiometrically synthesized to an exact molecular configuration and extent, the product, unlike polymers of which the molecular weight as a Gaussian statistical distribution, is a crystalline solid. The product is especially useful as an additive to improve the high-pressure, high-temperature properties of engine lubricating oils. Dispersed in soils it bonds the particles together to obtain a soil of good texture.

In procedures essentially the same as the foregoing, by the use of the indicated appropriate starting materials, other products of the present invention are prepared.

Various of the p-halobenzenethiols necessary as starting materials in the practice of the present invention are articles of commerce. However, those which are not can readily be prepared in known procedures such as, for example, the method of Hubner and Alsberg, see Liebig's Annallen der Chemie, volume 156, pages 308–332, 344–359, note especially page 327 and following where the authors show the hydrogenation of a halobenzenesulfonyl halide. Other methods are known to those skilled in the art.

I claim:
Bis(p-phenylthio)phenyl)sulfide.

No references cited.